United States Patent
Nagai et al.

(10) Patent No.: US 12,398,911 B2
(45) Date of Patent: Aug. 26, 2025

(54) AIR CONDITIONING APPARATUS

(71) Applicant: Carrier Japan Corporation, Tokyo (JP)

(72) Inventors: Hiroyuki Nagai, Fuji (JP); Ken Miura, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 132 days.

(21) Appl. No.: 18/184,308

(22) Filed: Mar. 15, 2023

(65) Prior Publication Data

US 2023/0213234 A1 Jul. 6, 2023

Related U.S. Application Data

(63) Continuation of application No. PCT/JP2020/034966, filed on Sep. 15, 2020.

(51) Int. Cl.
- *F24F 11/84* (2018.01)
- *F24F 1/16* (2011.01)
- *F25B 6/04* (2006.01)

(52) U.S. Cl.
CPC .............. *F24F 11/84* (2018.01); *F24F 1/16* (2013.01); *F25B 6/04* (2013.01); *F25B 2600/25* (2013.01)

(58) Field of Classification Search
CPC ..... F24F 11/84; F24F 1/16; F25B 6/04; F25B 2600/25; F25B 6/02; F25B 41/20; F25B 41/24; F25B 2313/0233; F25B 2313/0253; F25B 2313/0254; F25B 2313/0294; F25B 49/02; F25B 13/00; F25B 2313/0315; F25B 2600/2513; F25B 2700/1931; F25B 2700/1933; F25B 2700/21151; F25B 2700/21152; Y02B 30/70

See application file for complete search history.

(56) References Cited

U.S. PATENT DOCUMENTS

| | | |
|---|---|---|
| 2010/0170295 A1 | 7/2010 | Okazaki et al. |
| 2014/0165628 A1 | 6/2014 | Tamura et al. |
| 2019/0145669 A1 | 5/2019 | Tanaka et al. |

FOREIGN PATENT DOCUMENTS

| | | | |
|---|---|---|---|
| JP | H02208452 A | | 8/1990 |
| JP | 2004003691 A | | 1/2004 |
| JP | 2005241019 A | * | 9/2005 |
| JP | 2006029734 A | | 2/2006 |
| JP | 2011220616 A | | 11/2011 |
| JP | 2014214951 A | | 11/2014 |
| JP | 5747968 B2 | | 4/2015 |

(Continued)

OTHER PUBLICATIONS

Extended European Search Report mailed on Mar. 25, 2024, for European Patent Application No. 20954061.6, a foreign counterpart of U.S. Appl. No. 18/184,308, 10 pages.

(Continued)

*Primary Examiner* — Kun Kai Ma
(74) *Attorney, Agent, or Firm* — Lee & Hayes, P.C.

(57) ABSTRACT

According to one embodiment, in a low speed drive of outdoor fans, a first flow rate adjusting valve in a main outdoor heat exchanger side is narrowed to a closing degree or a close range thereof, and an opening degree of a second flow rate adjusting valve is controlled such that a supercooling degree of refrigerant in auxiliary outdoor heat exchangers becomes constantly a target value.

3 Claims, 3 Drawing Sheets

(56) References Cited

FOREIGN PATENT DOCUMENTS

| WO | WO2008146709 A1 | 12/2008 | |
|---|---|---|---|
| WO | WO-2015030173 A1 * | 3/2015 | ................ F24F 1/14 |
| WO | WO-2015115546 A1 * | 8/2015 | .............. F25B 49/02 |
| WO | WO2018020654 A1 | 2/2018 | |

OTHER PUBLICATIONS

PCT Search Report and Written Opinion mailed on Nov. 24, 2020, for PCT Application No. PCT/JP2020/034966, 15 Pages.

* cited by examiner

AIR CONDITIONING APPARATUS

CROSS-REFERENCE TO RELATED APPLICATIONS

This application is a Continuation Application of PCT Application No. PCT/JP2020/034966, filed Sep. 15, 2020, the entire contents of which are incorporated herein by reference.

FIELD

Embodiments described herein relate generally to a multi-type air conditioning apparatus including a compressor, outdoor heat exchanger, and a plurality of indoor heat exchangers.

BACKGROUND

Multi-type air conditioning apparatuses including a compressor, outdoor heat exchanger, and a plurality of indoor heat exchangers are configured, in a cooling drive, to supply refrigerant discharged from the compressor to the outdoor heat exchanger, to supply the refrigerant flowing from the outdoor heat exchanger to each indoor heat exchanger, and to return the refrigerant flowing from each indoor heat exchanger to the compressor.

An outdoor fan is located in the proximity of the outdoor heat exchanger, and an indoor fan is located in the proximity of each indoor heat exchanger. The refrigerant flowing into the outdoor heat exchanger is heat-exchanged with outdoor air taken by the outdoor fan to be condensed into liquefied refrigerant. The refrigerant flowing into the indoor heat exchanger is heat-exchanged with indoor air taken by the indoor fan to be evaporated.

In the cooling drive, if the outdoor fan drives in a low-speed in order to deal with decrease of an outside temperature, the flowing rate to the outdoor heat exchanger decreases. In that case, the refrigerant flowing into the outdoor heat exchanger cannot be sufficiently condensed, and thereby, there may be a case where a gas-liquid two-phase refrigerant in which liquefied refrigerant and gaseous refrigerant are mixed flows from the outdoor heat exchanger. With the refrigerant in such a state, suitable distribution of the refrigerant to each indoor heat exchanger from the outdoor heat becomes difficult.

An embodiment of the present application presents an air conditioning apparatus which can suitably distribute refrigerant flowing from an outdoor heat exchanger to each indoor heat exchanger.

DETAILED DESCRIPTION

Hereinafter, an embodiment of the present application will be explained with reference to the accompanying drawings.

An air conditioning apparatus of claim 1 comprises: an outdoor unit including a compressor, a main outdoor heat exchanger, a first flow rate adjusting valve configured to adjust a flow rate of refrigerant into the main outdoor heat exchanger using a change in an opening degree thereof, an auxiliary outdoor heat exchanger, a second flow rate adjusting valve configured to adjust a flow rate of refrigerant into the auxiliary outdoor heat exchanger using a change in an opening degree thereof, and an outdoor fan configured to introduce outdoor air into the main outdoor heat exchanger and the auxiliary outdoor heat exchanger, where the main outdoor heat exchanger and the auxiliary outdoor heat exchanger are accommodated to be aligned vertically in a position corresponding to an intake port of a side surface part of a casing, and the outdoor fan is accommodated in a position corresponding to an exhaust port of an upper surface part of the casing; at least one indoor unit including an indoor heat exchanger; a refrigeration cycle configured to flow refrigerant discharged from the compressor to the main outdoor heat exchanger and the auxiliary outdoor heat exchanger, to pass the refrigerant flowing from the main outdoor heat exchanger and the auxiliary outdoor heat exchanger to the indoor heat exchanger through the first and second flow rate adjusting valves, and to return the refrigerant flowing from the indoor heat exchanger to the compressor; and an outdoor controller configured to close the first flow rate adjusting valve to a closing degree or an approximate degree thereto when the outdoor fan is driven in a low speed, and to control the opening degree of the second flow rate adjusting valve such that a supercooling degree of the refrigerant in the auxiliary outdoor heat exchanger becomes constant to a target value.

Figure 1:
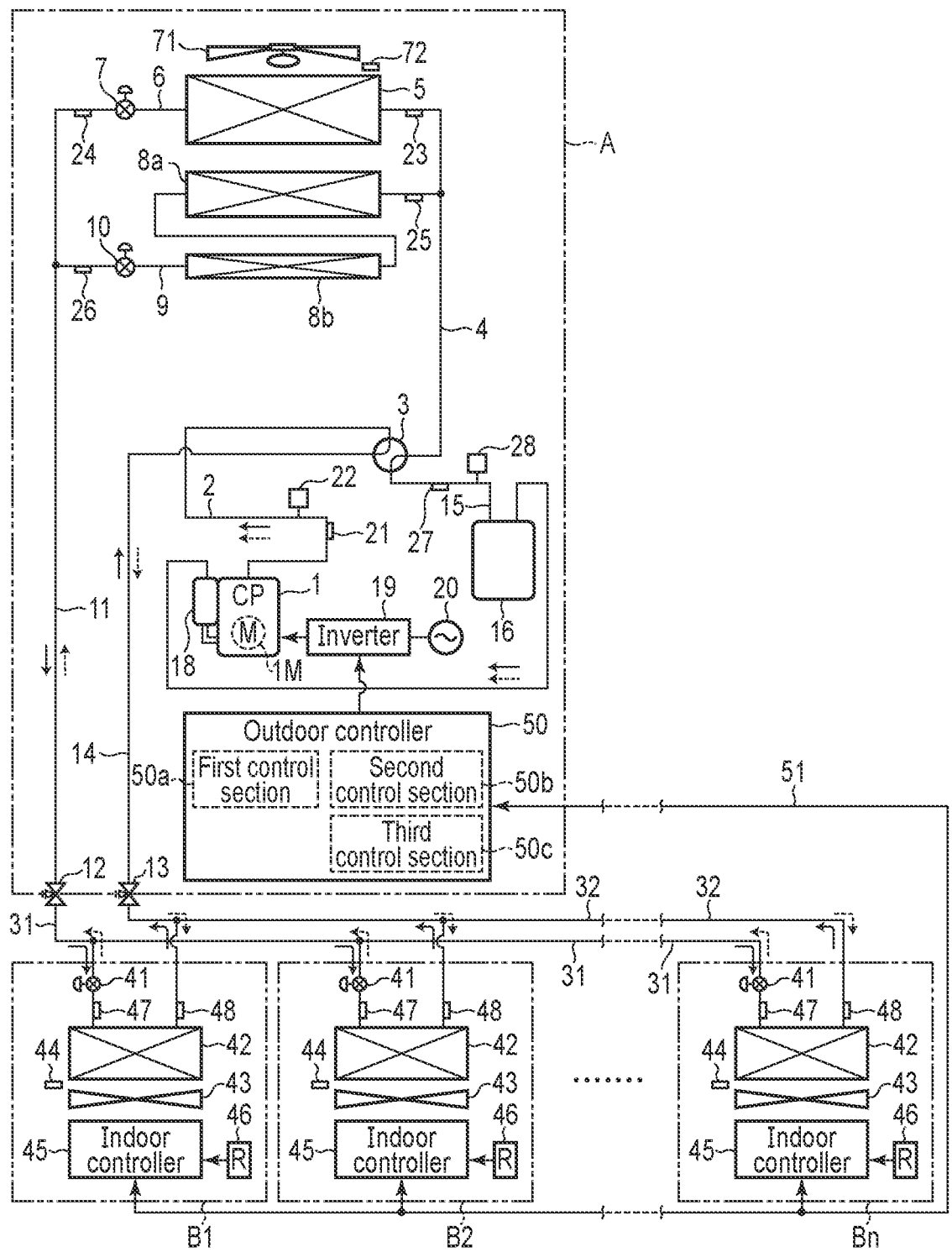
FIG. 1 illustrates an overall structure of an embodiment.

As in FIG. 1, a four-way valve 3 is connected to a discharge port of a compressor 1 via a high pressure side pipe 2, and one end of the main outdoor heat exchanger 5 is connected to the four-way valve 3 via a gas side pipe 4. To the other end of the outdoor heat exchanger 5, one end of a liquid side pipe 11 is connected via a liquid side pipe 6 and a decompressor arranged on the liquid side pipe 6 such as a flow rate adjusting valve (first flow rate adjusting valve) 7, and a packed valve 12 is connected to the other end of the liquid side pipe 11.

Furthermore, one end of an auxiliary outdoor heat exchanger 8a is connected to the gas side pipe 4, one end of an auxiliary outdoor heat exchanger 8b which is a super-cooling heat exchanger is connected to the other end of the auxiliary outdoor heat exchanger 8a, and the liquid side pipe 11 is connected to the other end of the auxiliary outdoor heat exchanger 8b via a liquid side pipe 9 and a decompressor arranged on the liquid side pipe 9 such as a flow rate adjusting valve (second flow rate adjusting valve) 10. The auxiliary outdoor heat exchangers 8a and 8b are connected to each other in series.

One ends of a plurality of indoor heat exchangers 42 are connected to the packed valve 12 via a liquid side connecting pipe 31 and a plurality of flow rate adjusting valves (third flow rate adjusting valves) 41, and the other ends of the indoor heat exchangers 42 are connected to a packed valve 13 via a gas side connecting pipe 32.

The flow rate adjusting valves 7, 10, and 41 are pulse motor valves (PMVs) opening degree of which sequentially changes from closing degree which is minimal to fully opening degree which is maximum in accordance with the number of drive pulse signals input thereto. Hereinafter, the flow rate adjusting valves 7, 10, and 41 will be referred to as PMV 7, 10, and 41, respectively.

The four-way valve 3 is connected to the packed valve 13 via the gas side pipe 14, and an intake port of an accumulator 16 is connected to the four-way valve 3 via a low pressure side pipe 15. A suction cup 18 of the compressor 1 is connected to a discharge port of the accumulator 16 via a low pressure side pipe 17.

With the aforementioned pipe connection, a heat pump refrigeration cycle which can perform both cooling drive and heating drive is achieved.

An outdoor fan 71 is located in the proximity of the main outdoor heat exchanger 5 and the auxiliary outdoor heat exchangers 8a and 8b in order to take in the outdoor air and flow the taken air to the main outdoor heat exchanger 5 and the auxiliary outdoor heat exchangers 8a and 8b. An indoor fan 43 is located in the proximity of each of the indoor heat exchangers 42 in order to take in the indoor air and flow the taken air to each of the indoor heat exchangers 42.

The compressor 1 is an air-tight compressor in which a motor 1M which is operated based on outputs of an inverter 19 is accommodated in an air-tight case, and is configured to take in the refrigerant flowing from the accumulator 16, to compress the refrigerant, and to discharge the compressed refrigerant. The inverter 19 converts an alternate voltage of an alternate power source 20 into a direct voltage, and converts the direct voltage into an alternate voltage of frequency F (output frequency F) corresponding to a command from an outdoor controller 50 for output. In accordance with the value of the output frequency F, revolution speed of the motor 1M, that is, performance of the compressor 1 is changed.

In the cooling drive, as depicted in the solid arrows, gaseous refrigerant discharged from the compressor 1 passes the four-way valve 3 into the main outdoor heat exchanger 5 and the auxiliary outdoor heat exchangers 8a and 8b, then liquefied refrigerant flowing from the main outdoor heat exchanger 5 and the auxiliary outdoor heat exchangers 8a and 8b passes the PMVs 7 and 10 and each PMV 41 into the heat exchanger 42, and the gaseous refrigerant flowing from each indoor heat exchanger 42 passes the four-way valve 3 and the accumulator 16 to be sucked into the compressor 1. The gaseous refrigerant flowing into the main outdoor heat exchanger 5 and the auxiliary outdoor heat exchangers 8a and 8b is heat-exchanged with the outdoor air taken by the outdoor fan 71, and condensed to be liquefied refrigerant. The liquefied refrigerant flowing into each indoor heat exchanger 42 is heat-exchanged with the indoor air taken by each indoor fan 43, and evaporated to be gaseous refrigerant.

In the heating drive, the channel of the four-way valve 3 is changed, and as depicted in the dotted arrows, gaseous refrigerant discharged from the compressor 1 passes the four-way valve 3 into each indoor heat exchanger 42, and liquefied refrigerant flowing from each indoor heat exchanger 42 passes each PMV 41 and PMVs 7 and 10, main outdoor heat exchanger 5 and auxiliary outdoor heat exchangers 8b and 8a, four-way valve 3, and accumulator 16 and is sucked into the compressor 1. The gaseous refrigerant flowing into each indoor heat exchanger 42 is heat-exchanged with the indoor air taken by each indoor fan 43, and condensed to be liquefied refrigerant. The liquefied refrigerant flowing into the main outdoor heat exchanger (evaporator) 5 and the auxiliary outdoor heat exchangers 8b and 8a is heat-exchanged with the outdoor air taken by the outdoor fan 71, and evaporated to be gaseous refrigerant.

In the passage of the outdoor air taken by the drive of the outdoor fan 71, an outdoor air temperature sensor 72 configured to detect a temperature of outdoor air (outdoor air temperature) To is located. In the high pressure side pipe 2 between the discharge port of the compressor 1 and the four-way valve 3, a temperature sensor 21 configured to detect a high pressure side refrigerant temperature Td and a pressure sensor 22 configured to detect a high pressure side refrigerant pressure Pd are attached. A temperature sensor 23 configured to detect a refrigerant temperature Tx' is attached to a branched passage of the gas side pipe 4 into the main outdoor heat exchanger 5, and a temperature sensor 24 configured to detect a refrigerant temperature Tx2 is attached to the liquid side pipe 6 connecting to the main outdoor heat exchanger 5 at a position closer to the liquid side pipe 11 than is the PMV 7. A temperature sensor 25 configured to detect a refrigerant temperature Ty1 is attached to a branched passage of the gas side pipe 4 into the auxiliary outdoor heat exchanger 8a, and a temperature sensor 26 configured to detect a refrigerant temperature Ty2 is attached to the liquid side pipe 9 connecting to the auxiliary outdoor heat exchanger 8b at a position closer to the liquid side pipe 11 than is the PMV 10. A temperature sensor 27 configured to detect a low pressure side refrigerant temperature Ts and a pressure sensor 28 configured to detect a low pressure side refrigerant pressure Ps are attached to a low pressure side pipe 15 between the four-way valve 3 and the accumulator 16. Signals detected by the aforementioned temperature and pressure sensors are sent to an outdoor controller 50.

An indoor temperature sensor 44 configured to detect an indoor temperature Ta is located at each passage of the indoor air taken by the indoor fans 43. A temperature sensor 47 configured to detect a refrigerant temperature Tc1 is attached to each branched passage of the liquid side connecting pipe 31 to each indoor heat exchanger 42, and a temperature sensor 48 configured to detect a refrigerant temperature Tc2 is attached to each branched passage of the gas side connecting pipe 32 to each indoor heat exchanger 42. Signals detected by the aforementioned temperature sensors 47 and 48 are sent to each indoor controller 45. A remote control operation unit (remote controller) 46 is connected to each indoor controller 45 for user to set various drive conditions such as cooling drive, dehumidifying drive, heating drive, ventilating drive, target indoor temperature Tas, drive start, and drive stop.

The compressor 1, four-way valve 3, main outdoor heat exchanger 5, auxiliary outdoor heat exchangers 8a and 8b, PMVs 7 and 10, packed valves 12 and 13, accumulator 16, inverter 19, outdoor fan 71, each pipe, each sensor, and outdoor controller 50 are accommodated in an outdoor unit A. Furthermore, the aforementioned indoor heat exchanger 42, outdoor fan 43, indoor controller 45, operation unit 46, pipe, and sensor are each accommodated as set in N indoor units B1, B2, . . . , and Bn.

A multi-type air conditioning apparatus is structured with the aforementioned outdoor unit A and indoor units B1, B2, . . . , and Bn. The outdoor controller 50 and each indoor controller 45 are mutually connected through a data transmission signal line 51.

Figure 2:
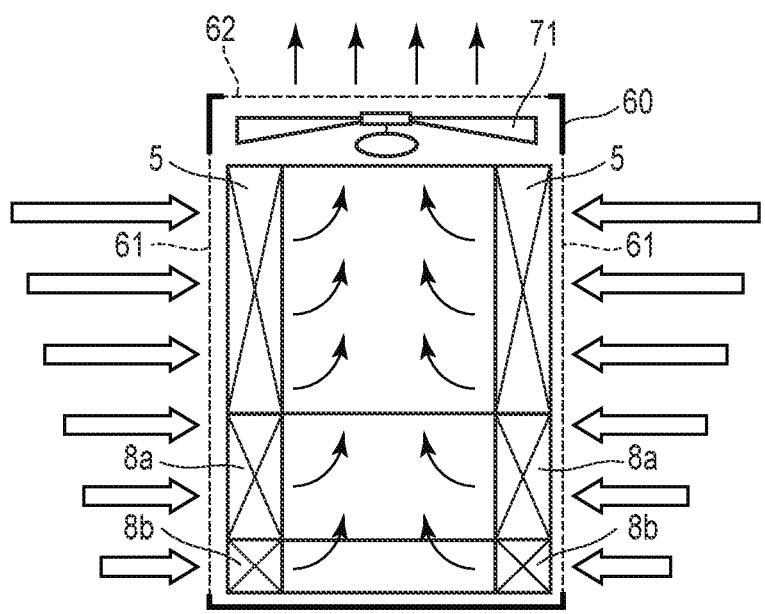
FIG. 2 illustrates a structure of an outdoor unit of the embodiment.

The outdoor unit A accommodates, as in FIG. 2, the main outdoor heat exchanger 5 and the auxiliary outdoor heat exchangers 8a and 8b to be vertically aligned in a position corresponding to an intake port 61 of a side surface part of a casing 60, and the outdoor fan 71 in a position corresponding to an exhaust port 62 of an upper surface part of the casing 60.

If the total volume of the main outdoor heat exchanger 5 and the auxiliary outdoor heat exchangers 8a and 8b is given 100%, the volume of the main outdoor heat exchanger 5 is approximately 50% thereof, the volume of the auxiliary outdoor heat exchanger 8a is approximately 30% thereof, and the volume of the auxiliary outdoor heat exchanger 8b is approximately 20% thereof.

When the outdoor fan 71 is driven, the outdoor air is sucked into the casing 60 through the intake ports 61 as indicated by arrows of FIG. 2, the air sucked passes the main outdoor heat exchanger 5 and the auxiliary outdoor heat exchangers 8a and 8b. The air passing through the aforementioned exchangers rises toward the upper outdoor fans 71 to be discharged to the outdoor atmosphere through the outdoor fan 71 and the exhaust port 62.

Speed of air to be sucked into the main outdoor heat exchanger 5 located closer to the upper outdoor fan 71 becomes greater, and a large amount of outdoor air flows into the main outdoor heat exchanger 5. The speed of air to be sucked into the auxiliary outdoor heat exchanger 8a which is apart from the outdoor fan 71 by a space of the main outdoor heat exchanger 5 is smaller than the speed of air to be sucked into the main outdoor heat exchanger 5, and thus, the amount of outdoor air flowing into the auxiliary outdoor heat exchanger 8a is smaller than the amount of outdoor air flowing into the main outdoor heat exchanger 5. The speed of air to be sucked into the auxiliary outdoor heat exchanger 8b which is further apart from the outdoor fan 71 than is the auxiliary outdoor heat exchanger 8a is smaller than the speed of air to be sucked into the auxiliary outdoor heat exchanger 8a, and thus, the amount of outdoor air flowing into the auxiliary outdoor heat exchanger 8b is smaller than the amount of outdoor air flowing into the auxiliary outdoor heat exchanger 8a. The distributions (differences) of the outdoor air amount (speed) sucked into the main outdoor heat exchanger 5 and the auxiliary outdoor heat exchangers 8a and 8b are represented by lengths of hollowed arrows.

The outdoor controller 50 is to control the drive of the outdoor unit A and the indoor units B1, B2, . . . , and Bn in cooperation with each indoor controller 45. One of the main functions thereof is narrowing the PMV 7 to the closing degree or a degree near thereto in the low speed drive of the outdoor fan 71, and controlling the opening degree of the PMV 10 such that the supercooling degree of the refrigerant of the auxiliary outdoor heat exchangers 8a and 8b becomes constantly a target value. For the controlling, the outdoor controller 50 includes a first control section 50a, second control section 50b, and third control section 50c.

The first control section 50a performs, in the cooling drive and if the outdoor air temperature To is equal to or greater than a predetermined value Tos, the high speed drive (or middle speed drive) of the outdoor fan 71 to sufficiently gain a radiation effect of the refrigerant to the outdoor air, and at the same time, performs a supercooling degree constant value control to operate the opening degree of the PMV 7 such that a supercooling degree SCx of the refrigerant in the main outdoor heat exchanger (condenser) 5 becomes constantly a target value SCxs and to operate the opening degree of the PMV 10 such that a supercooling degree SCy of the refrigerant in the auxiliary outdoor heat exchangers (condensers) 8a and 8b becomes constantly a target value SCys.

The supercooling degree SCx of the refrigerant of the main outdoor heat exchanger 5 can be detected as a difference between a condensation temperature of refrigerant in the main outdoor heat exchanger 5 and the auxiliary outdoor heat exchangers 8a and 8b and a temperature Tx2 of refrigerant flowing from the main outdoor heat exchanger 5 (detection temperature of temperature sensor 24). The condensation temperature of the refrigerant can be converted from a refrigerant pressure Pd detected by the pressure sensor 22 of the high pressure side pipe 2. The supercooling degree SCy of the refrigerant of the auxiliary outdoor heat exchangers 8a and 8b can be detected as a difference between the aforementioned condensation temperature and a temperature Ty2 of the refrigerant flowing from the auxiliary outdoor heat exchangers 8a and 8b (detection temperature of temperature sensor 26).

The second control section 50b performs, in the cooling drive and if the outdoor air temperature To is below a predetermined value Tos, that is, in a situation where the radiation effect of the refrigerant to the outdoor air can be sufficiently gained, the low speed drive of the outdoor fan 71, and at the same time, performs a supercooling degree constant value control to narrow the opening degree of the PMV 7 to the closing degree or a degree near thereto such that the refrigerant does not flow into the main outdoor heat exchanger 5 and to operate the opening degree of the PMV 10 such that the supercooling degree SCy of the refrigerant in the auxiliary outdoor heat exchangers (condensers) 8a and 8b becomes constantly a target value SCys.

The supercooling degree SCy of the refrigerant of the auxiliary outdoor heat exchangers 8a and 8b can be detected as a difference between the condensation temperature of the refrigerant of the auxiliary outdoor heat exchangers 8a and 8b and a temperature Ty2 of the refrigerant flowing from the auxiliary outdoor heat exchangers 8a and 8b (detection temperature of temperature sensor 26). The condensation temperature of the refrigerant of the auxiliary outdoor heat exchangers 8a and 8b can be converted from a refrigerant pressure Pd detected by the pressure sensor 22 of the high pressure side pipe 2.

The third control section 50c performs, in the heating drive, the high speed drive (or middle speed drive) of the outdoor fan 71, and at the same time, performs a superheating degree constant value control to operate the opening degree of the PMV 7 such that a superheating degree SHx of the refrigerant in the main outdoor heat exchanger (condenser) 5 becomes constantly a target value SHxs and to operate the opening degree of the PMV 10 such that a superheating degree SHy of the refrigerant in the auxiliary outdoor heat exchangers (condensers) 8a and 8b becomes constantly a target value SHys.

The superheating degree SHx of the refrigerant of the main outdoor heat exchanger 5 can be detected as a difference between a detection temperature Tx' of the temperature sensor 23 and a detection temperature Tx2 of the temperature sensor 24. The superheating degree SHy of the refrigerant of the auxiliary outdoor heat exchangers 8a and 8b can be detected as a difference between a detection temperature Ty1 of the temperature sensor 25 and a detection temperature Ty2 of the temperature sensor 26.

Figure 3:
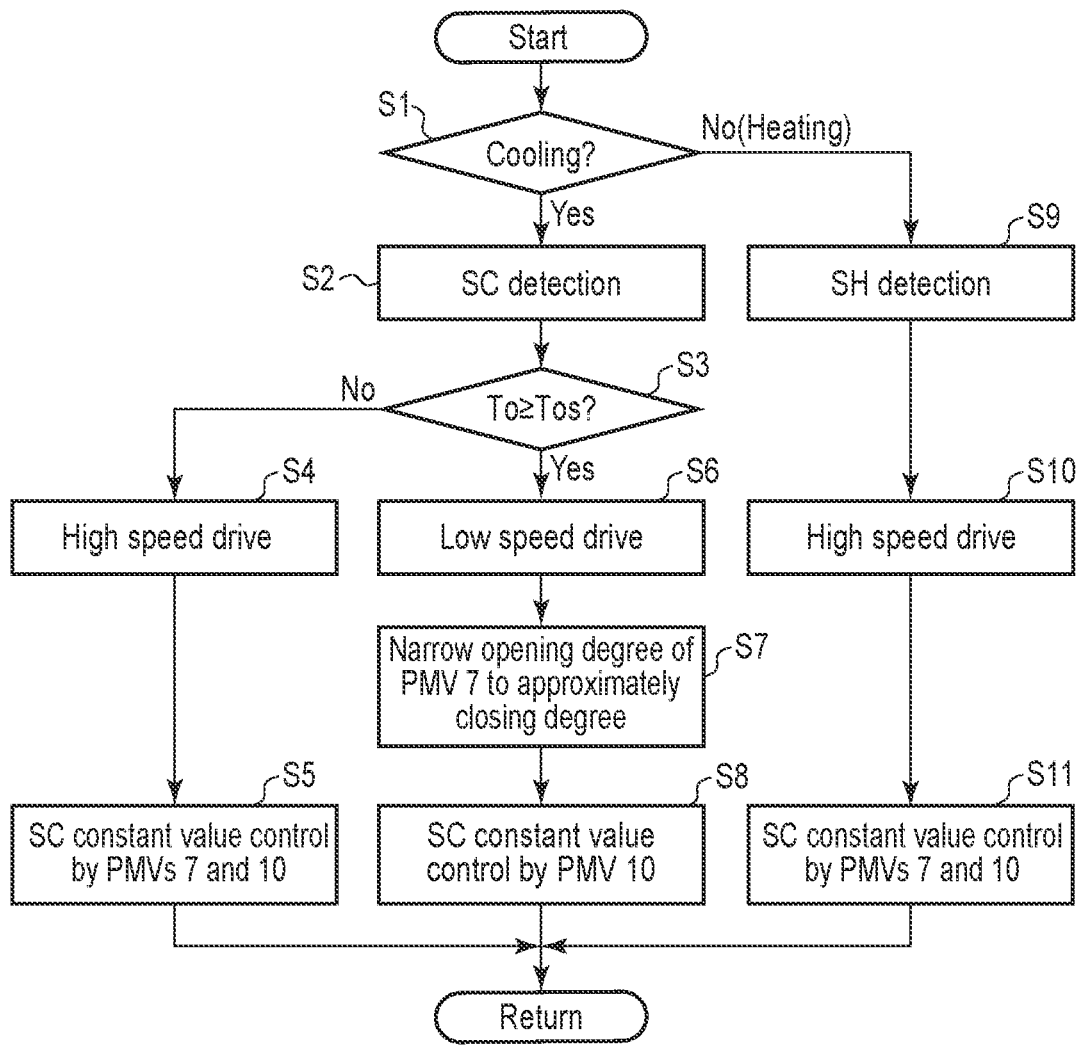
FIG. 3 is a flowchart of controlling of the embodiment.

Now, the control executed by the outdoor controller 50 will be explained with reference to the flowchart of FIG. 3. Steps S1, S2, etc. in the flowchart will be simply referred to as S1, S2, etc.

In a cooling drive (YES in S1), the outdoor controller 50 detects a supercooling degree SCx of refrigerant of the main outdoor heat exchanger (condenser) 5 and a supercooling degree SCy of refrigerant of the auxiliary outdoor heat exchangers (condensers) 8a and 8b (S2). The outdoor controller 50 monitors whether or not an outdoor air temperature To is equal to or greater than a predetermined value Tos (S3).

If the outdoor air temperature To is equal to or greater than the predetermined value Tos (YES in S3), the outdoor controller 50 performs a high speed drive (or middle speed drive) of the outdoor fan 71 determining that a sufficient heat discharge effect of the refrigerant to the outdoor air is not gained (S4). Then, the outdoor controller 50 executes a supercooling degree constant value control to control an opening degree of the PMV 7 such that the detected supercooling degree SCx becomes constantly a target value SCxs and to control an opening degree of the PMV 10 such that the detected supercooling degree SCy becomes constantly a target value SCys (S5). Then, the outdoor controller 50 returns to the aforementioned determination of S1.

If the outdoor air temperature To is less than the predetermined value Tos (NO in S3), the outdoor controller 50 performs a low speed drive of the outdoor fan 71 determining that a heat discharge effect of the refrigerant to the outdoor air is gained (S6).

However, in such a low speed drive of the outdoor fan 71, an amount of air flow in the main outdoor heat exchanger 5 decreases and an amount of air flow in the auxiliary outdoor heat exchangers 8*a* and 8*b* accordingly, and a decrease ratio in the heat exchange in the main outdoor heat exchanger 5 which has a larger volume and is positioned closer to the outdoor fan 71 is greater than a decrease ratio in the heat exchange in the auxiliary outdoor heat exchangers 8*a* and 8*b*. In such a condition, gaseous refrigerant flowing into the auxiliary outdoor heat exchangers 8*a* and 8*b* may be sufficiently condensed while the gaseous refrigerant flowing into the main outdoor heat exchanger 5 cannot be sufficiently condensed, and thus, a mixture of liquefied refrigerant and gaseous refrigerant, that is, a gas-liquid two-phase state refrigerant would be flowing from the main outdoor heat exchanger 5. With this condition, suitable distribution of the refrigerant to each indoor heat exchanger 42 becomes difficult.

Therefore, the outdoor controller 50 performs the low speed drive of the outdoor fan 71 in S6 while narrowing the opening degree of the PMV 7 to a closing degree or a degree near thereto such that the refrigerant does not flow into the main outdoor heat exchanger 5 (S7), and performs a supercooling degree constant value control to control the opening degree of the PMV 10 such that the supercooling degree SCy of the refrigerant of the auxiliary outdoor heat exchangers 8*a* and 8*b* becomes constantly the target value SCys (S8). Then, the outdoor controller 50 returns to the aforementioned determination of S1.

As can be understood from the above, when only the auxiliary outdoor heat exchangers 8*a* and 8*b* are used as condensers while the main outdoor heat exchanger 5 is not used as a condenser, a possibility that a mixture of liquefied refrigerant and gaseous refrigerant, that is, a gas-liquid two-phase state refrigerant flows from the main outdoor heat exchanger 5 can be avoided. Thus, the liquefied refrigerant flowing from the auxiliary outdoor heat exchangers 8*a* and 8*b* can be properly distributed to each indoor heat exchanger 42, and efficient and proper cooling can be achieved in the indoor units B1, B2, . . . , and Bn.

In a heating drive (NO in S1), the outdoor controller 50 detects a superheating degree SHx of refrigerant of the main outdoor heat exchanger (evaporator) 5 and a superheating degree SHy of refrigerant of the auxiliary outdoor heat exchangers (evaporators) 8*a* and 8*b* (S9). Then, the outdoor controller 50 performs a high speed drive (or middle speed drive) of the outdoor fan 71 (S10) while executing a supercooling degree constant value control to control an opening degree of the PMV 7 such that the detected superheating degree SHx becomes constantly a target value SHxs and to control an opening degree of the PMV 10 such that the detected superheating degree SHy becomes constantly a target value SHys (S11). Then, the outdoor controller 50 returns to the aforementioned determination of S1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An air conditioning apparatus comprising:
    an outdoor unit including a compressor, a main outdoor heat exchanger, a first flow rate adjusting valve configured to adjust a flow rate of refrigerant into the main outdoor heat exchanger using a change in an opening degree thereof, an auxiliary outdoor heat exchanger, a second flow rate adjusting valve configured to adjust a flow rate of refrigerant into the auxiliary outdoor heat exchanger using a change in an opening degree thereof, and an outdoor fan configured to introduce outdoor air into the main outdoor heat exchanger and the auxiliary outdoor heat exchanger, where the main outdoor heat exchanger and the auxiliary outdoor heat exchanger are accommodated to be aligned vertically in a position corresponding to an intake port of a side surface part of a casing, and the outdoor fan is accommodated in a position corresponding to an exhaust port of an upper surface part of the casing;
    at least one indoor unit including an indoor heat exchanger;
    a refrigeration cycle configured to flow refrigerant discharged from the compressor to the main outdoor heat exchanger and the auxiliary outdoor heat exchanger, to pass the refrigerant flowing from the main outdoor heat exchanger and the auxiliary outdoor heat exchanger to the indoor heat exchanger through the first and second flow rate adjusting valves, and to return the refrigerant flowing from the indoor heat exchanger to the compressor; and
    an outdoor controller configured to close the first flow rate adjusting valve to a closing degree or an approximate degree thereto when the outdoor fan is driven in a low speed, and to control the opening degree of the second flow rate adjusting valve such that a supercooling degree of the refrigerant in the auxiliary outdoor heat exchanger becomes constant to a target value;
    wherein the auxiliary outdoor heat exchanger includes a first auxiliary outdoor heat exchanger and a second auxiliary outdoor heat exchanger which are connected to each other in series.

2. The air conditioning apparatus of claim 1, wherein, the refrigeration cycle is a heat pump refrigeration cycle in which, in a cooling drive, the refrigerant discharged from the compressor is supplied to the main outdoor heat exchanger and the auxiliary outdoor heat exchanger, the refrigerant flowing from the main outdoor heat exchanger and the auxiliary outdoor heat exchanger is passed to the indoor heat exchanger through the first and second flow rate adjusting valves, and the refrigerant flowing from the indoor heat exchanger is returned to the compressor, and in a heating drive, the refrigerant discharged from the compressor is supplied to the indoor heat exchanger, the refrigerant flowing from the indoor heat exchanger is passed to the main outdoor heat exchanger and the auxiliary outdoor heat exchanger through the first and second flow rate adjusting valves, and the refrigerant flowing from the main outdoor heat exchanger and the auxiliary outdoor heat exchanger is returned to the compressor, and the outdoor controller drives, during the cooling drive, the outdoor fan in a high speed or a middle speed when a temperature of the outdoor air is equal to or greater than a predetermined value while driving the outdoor fan in a low speed when the temperature of the outdoor air is less than the predetermined value.

3. The air conditioning apparatus of claim 1, wherein, a total volume of the main outdoor heat exchanger, the first auxiliary outdoor heat exchanger and the second auxiliary outdoor heat exchanger is 100%, a volume of the main outdoor heat exchanger is approximately 50%, a volume of the first auxiliary outdoor heat exchanger is approximately 30%, and a volume of the second auxiliary outdoor heat exchanger is approximately 20%.

* * * * *